Sept. 26, 1933.  G. J. LEXA  1,928,293
TORQUE MOTOR BRAKE CONTROL
Filed Aug. 12, 1929   2 Sheets-Sheet 1

INVENTOR.
George J. Lexa
BY
Bottume, Hadnall, Lecher, McNamara and Michael
ATTORNEYS.

Sept. 26, 1933.  G. J. LEXA  1,928,293
TORQUE MOTOR BRAKE CONTROL
Filed Aug. 12, 1929  2 Sheets-Sheet 2
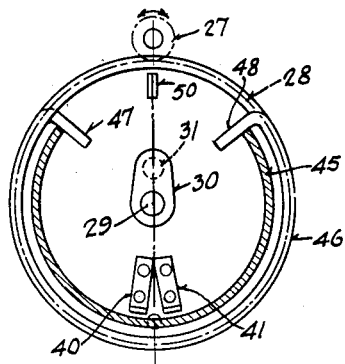
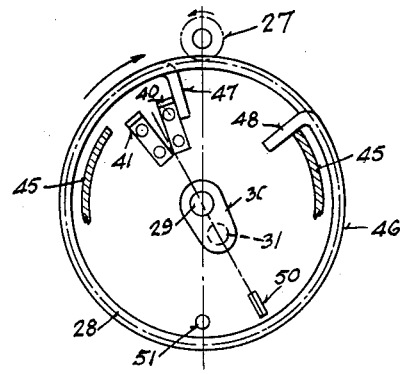
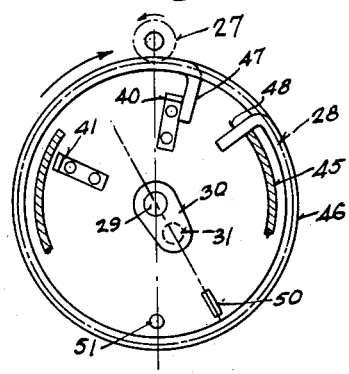
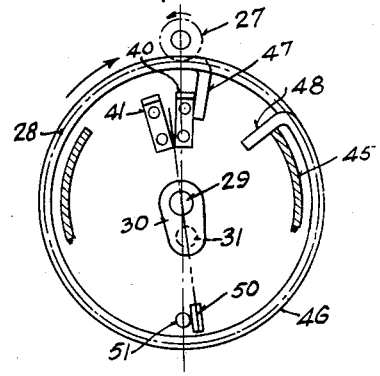
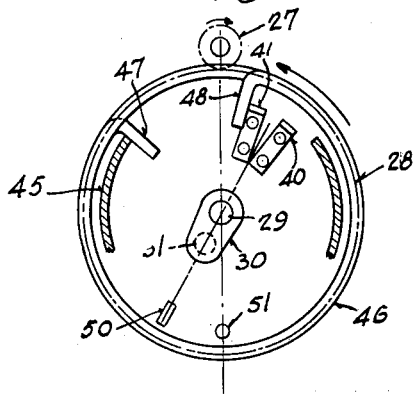
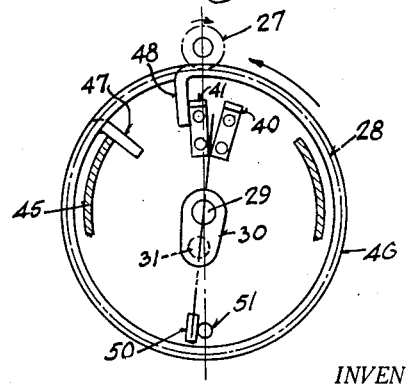
INVENTOR.
George J. Lexa
BY
ATTORNEYS.

Patented Sept. 26, 1933

1,928,293

UNITED STATES PATENT OFFICE 1,928,293

TORQUE MOTOR BRAKE CONTROL

George J. Lexa, Milwaukee, Wis., assignor to Harnischfeger Corporation, Milwaukee, Wis., a corporation of Wisconsin Application August 12, 1929. Serial No. 385,151

9 Claims. (Cl. 188—171)

This invention relates to torque motor brakes especially designed and adapted for use on hoisting apparatus although also adapted for other uses and applications.

Large hoist motors, such, for instance, as are used on cranes, are provided with a brake drum on the motor shaft and brake shoes which are biased into braking engagement with the drum. For releasing the brake a small torque motor, connected in parallel with the hoist motor, is provided, the torque motor actuating suitable operating mechanism for the brake shoes so that when the hoist motor is run in either direction, the torque motor will be energized and its armature or rotor will revolve until the operating mechanism has been moved a sufficient extent to release the brake. The torque motor then stands still under full voltage with the brake retained released and this condition obtains until the controller regulating the operation of the two motors is returned to the off position, when, of course, the current to the motors is interrupted whereupon the torque motor is returned to its original position and the brake shoes are thrown into braking engagement with the drum under the influence of the biasing means provided. The biasing is usually in the form of a spring suitably associated with the brake shoes. When the torque motor comes to a stop after having released the brake, it and the brake mechanism are both subjected to very considerable shock and stress which tends to work injury to or to break down the parts of the system.

One of the principal objects of the present invention is to provide a braking mechanism of this character in which the torque motor, when operated to release the brakes, is brought to a stop in a smooth and gradual manner and without heavy impacts or shocks on the torque motor or on any of the instrumentalities of the mechanism.

Another important object is to provide a braking system of this character and having the advantage mentioned and which is simple and durable in construction, easily adjusted to meet the varying conditions met in actual practice, reliable and effective in operation and easy and comparatively inexpensive to manufacture, install and maintain.

Other objects and advantages reside in certain novel features of the construction, arrangement and combination of parts which will be hereinafter more fully described and particularly pointed out in the appended claims, reference being had to the accompanying drawings forming a part of this specification, and in which:

Figures 4 to 9, inclusive, are diagrammatic views illustrating the action and adjustment of the stops or stop lugs of the cushion stopping mechanism.

Figure 1:
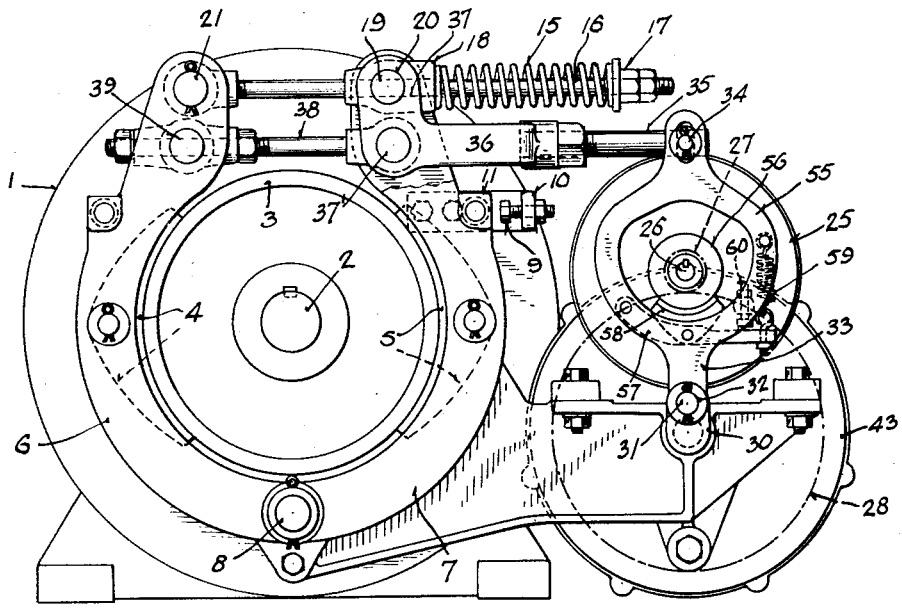
Figure 1 is a view in front elevation showing a braking mechanism embodying the present invention.

Referring to the drawings, the numeral 1 designates generally the main electric motor which may be the usual type of alternating current motor employed for hoisting apparatus, such as cranes, this motor 1 being utilized in the conventional way to drive the hoisting mechanism (not shown). The armature shaft 2 of the motor 1 has a brake drum 3 keyed thereto. Brake shoes 4 and 5 are provided and are mounted on hangers 6 and 7, respectively, the hangers having their lower ends pivoted on a common supporting shaft 8 carried by a stationary part of the mechanism. This type of brake is generally referred to in the trade as a clam shell brake. An adjustable stop screw 9 carried by a stationary bracket 10 fixed to the main motor casing or other stationary part is engageable with an abutment 11 provided on the adjacent brake hanger 7 to limit the movement of such hanger 7 away from the brake drum.

The brake shoes 4 and 5 are biased into braking engagement with the drum 3 under the influence of a compression coil spring 15 mounted on a rod 16 and having one end abutting a nut and washer assembly 17 provided on the rod 16 and constituting an adjustable abutment for the spring 15. The other end of the spring bears against an abutment block 18 having laterally extending trunnions 19 rotatably fitted in bearing openings 20 provided in the brake hanger 7. As will be understood from Figure 2 and as is conventional in the art, the brake hangers 6 and 7, which are identical, are of two-part construction. Thus, the brake hanger 7 has similar sections 7ª and 7ᵇ, the lower ends of which are pivoted on the shaft 8 and the upper ends of which are pivoted to the trunnions 19 of the block 18. The block 18 is provided with a longitudinal bore or opening 20 through which the rod 16 slides, the rod 16 extending beyond the block 18 and being pivotally connected as at 21 to the upper ends of the sections of the brake hanger 6. With this construction the spring 15, which is under suitable compression, pulls the rod 16 through the block 18 to pull or draw the hanger 6 and its shoe 4 toward the drum 3 and simultaneously it pushes against the block 18 to force the hanger 7 and brake shoe 5 toward the drum 3. Sufficient force is developed in this way to hold the drum 3 and consequently the motor shaft 2 and the hoisting mechanism against movement under full load when the motor is not energized.

For the purpose of releasing the brake at the proper time a torque or brake motor 25 is provided and as usual is connected in parallel with the hoist motor 1, both of the motors 1 and 25 being under the control of a suitable controller (not shown) in accordance with conventional or standard practice. The rotor shaft 26 of the torque motor 25 has a pinion 27 fixed thereto and meshing with a large gear wheel 28 fixed to a shaft 29 rotatably supported in a bearing bracket 30' provided below the motor 25. The outer end of the shaft 29 has a crank arm 30 fixed thereto and a pin 31 at the outer end of this crank arm 30 is pivotally interconnected as at 32 with the lower end of a link 33. The upper end of the link 33 has a pin and slot connection as at 34 with the outer end of an adjustable arm 35 of a bell crank lever 36, the other arm 37 of this bell crank lever 36 being pivotally supported on the trunnions 19 of the block 18. The elbow of the lever 36 is pivotally connected as at 37' to one end of a link or connecting rod 38 and the opposite end of this link or connecting rod 38 has an adjustable though positive pivotal connection with the sections of the hanger 6 as indicated at 39.

With a construction as thus far described, when current is supplied to the main motor and the torque motor, the rotor of the torque immediately revolves and its rotating shaft 26 acts through pinion 27, gear wheel 28, shaft 29, crank arm 30, crank pin 31, and link 33, to swing the bell crank lever 36 in a clockwise direction as viewed in Figure 1 and about the trunnions 19 as an axis. This exerts a thrust to the left as viewed in Figure 1 on the link 38 and forces the hanger 6 and its jaw 4 away from the drum against the action of the spring 15. The re-action which the hanger 6 presents to the application of this releasing force results in the bell crank lever swinging about its pivotal connection 37' as a fulcrum so that its arm 37 swings in a clockwise direction, as viewed in Figure 1, and forces the trunnions 19, block 18 and hanger 7 together with the brake shoe 5 to the right as viewed in Figure 1 whereby both brake shoes are released.

After the electric motor 25 has turned over a sufficient number of times to effect full release of the brake shoes it is essential that some means be provided for preventing the torque motor from imparting further movement to the brake mechanism as this would completely rotate crank pin 30 and result in undesirable application of the brakes while the main motor 1 is still running and during time when it is desirable to apply the full power of this main motor to the hoisting apparatus. In order to effect this purpose without subjecting the mechanism to any severe shocks or strains, adjustable stop lugs designated at 40 and 41 are releasably secured in any one of a number of positions on the outer face of the gear wheel 28 by means of stud bolts 42, the stud bolts 42 being selectively cooperable with any of the internally threaded openings 42' of the gear wheel 28. The pinion 27 and gear wheel 28 operated in a housing 43 provided with a removable cover plate 44 which, in the assembly, is securely bolted to the housing. The cover plate 44 has an integral arcuate flange 45 which projects into the housing and which, except for the gap shown to advantage in Figure 3 of the drawings, is almost a complete circle or annulus. A heavy coil or torsion spring 46 loosely encircles the flange 45 and has one end 47 extending inwardly over one edge of the gap and flange 45 and has its other end 48 also inturned and extending inwardly over the other edge of the gap of the flange 45. These inturned ends 47 and 48 lie in the path of movement of the lugs 40 and 41, respectively, and these lugs and inturned ends are so relatively positioned and the parts are so proportioned that when the torque motor has turned over sufficiently to fully release the brake, one or the other of the lugs 40 and 41 will engage its respective spring end 47 or 48, depending, of course, upon the direction in which the torque motor is running. This action is illustrated diagrammatically in Figures 4 to 9, inclusive.

Thus, in Figure 4, the lugs are shown in what might be said to be a neutral position, that is, in the position which they assume when the brake is applied and the torque motor is de-energized. If now the current is applied to the main motor and consequently also to the torque motor, the torque motor will drive pinion 27 and act through the gear 28 and the other mechanism previously described to release the brake. This, of course, involves a turning movement of the gear 28 so that the lugs 40 and 41 are carried from the position shown in Figure 4 to the position shown in Figure 5 whereupon the lug 40 engages the inturned end 47 of the spring 46 so that the force of the motor at first winds up the spring until the resistance of the spring is sufficient to stall the torque motor, which condition is illustrated in Figure 5. If the main hoist motor and torque motor run in an opposite direction from that just described, the gear wheel 28 will be oppositely turned and the lug 41 will be moved around until it engages the spring end 48 whereupon the spring will be again wound up until it accumulates sufficient energy to stall the torque motor (see Figure 7).

Figure 9 illustrates the different positioning of the lugs 40 and 41 which results in stalling of the motor upon a motor movement of different amplitude than that which occurs in the adjustment shown in Figures 4, 5 and 7.

The construction as thus described has been found to be extremely reliable and durable, to relieve the torque motor and other parts of the mechanism of injurious shocks and strains and to provide a smooth and easy brake action.

Figure 2:
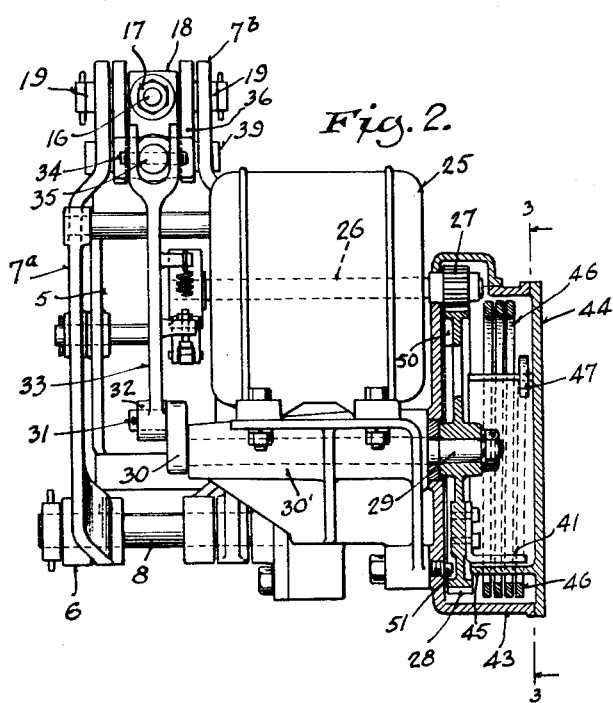
Figure 2 is a view in end elevation looking toward the left in Figure 1 and showing parts in vertical section to illustrate the spring stop mechanism, parts being omitted for the sake of simplicity in illustration.
Figure 3:
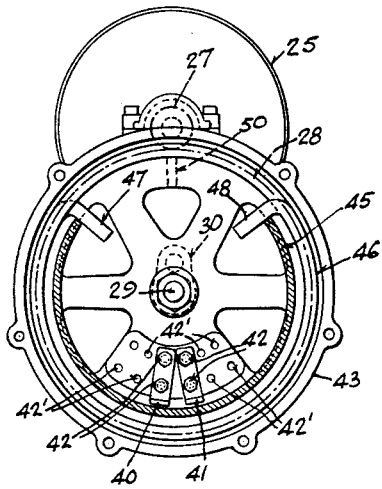
Figure 3 is a view in section taken on line 3—3 of Figure 1 and looking in the direction of the arrows, parts being omitted for the sake of simplicity in illustration.

To introduce an additional safety factor and avoid erratic brake action in the event of breakage or failure of the torsional spring 46, a stop lug 50 is cast integral with or otherwise suitably fixed to the face of the gear wheel 28 opposite that on which the lugs 40 and 41 are mounted and this fixed stop lug 50 is diametrically opposite the point on the gear wheel 28 which lies midway between the lugs 40 and 41 (see Figures 2 and 3). A stop pin 51 is threaded into the lower end of the housing 43 and projects into the path of the stop 50. Normally the stops 50 and 51 do not function. Thus, as shown in Figures 5 and 7, these stops have not engaged when the torque motor has been stopped by the action of the spring 46. If, however, the spring 46 should fail or if for any reason the torque motor should continue to tension the spring after the lugs 40 and 41 have assumed the position shown in Figures 5, 7 or 9, then the stop 50 continues to move until it strikes the fixed stop pin 51, as illustrated in Figures 6 and 8 whereby the torque motor is positively stopped.

After the brake has been released in this manner the torque motor will stand still under full voltage until the controller is returned to the off position at which time the torque motor, being de-energized, will be turned backwardly to its initial position under the influence of the torsion spring 46 and brake spring 16 so that the brake spring 16 will be effective to apply the brakes.

During this return movement or brake applying movement the parts acquire considerable momentum and in order to preclude over-running of the mechanism and the undesirable partial release of the brake shoes 4 and 5 that would result, the link 33 is provided with an intermediate loop or yoke 55 which extends around a drum 56 keyed or otherwise secured to the rotor shaft 26 of the torque motor. The link 33 has a brake arm 57 pivoted thereto and carrying a brake shoe 58, the brake shoe 58 being engageable with the brake drum 56. A retractile spring 59 having one end connected to the yoke 55 and having its other end connected to the arm 57, biases the arm 57 and the brake shoe 58 to braking position. Thus, whenever the link 33 is returned to its upper position by a rotation of the crank pin to its upper dead center position the brake shoe 58 coacts with the drum 56 to prevent over-running. However, as soon as the torque motor is positively energized, the link 33 is pulled downwardly and the brake shoe 58 is moved away from the drum 56 to release the torque motor for free rotation.

The extent of movement of the brake arm 57 under the influence of the spring 59 is limited by an adjustable stop 60 mounted on the yoke 55.

I claim:

1. The combination with a brake, means for biasing the brake to braking position, a torque motor, and operating mechanism actuated by the torque motor for controlling the application and release of the brake, a stop lug connected to and actuated by the operating mechanism, a torsion coil spring having an abutment portion lying in the path of movement of the stop lug, and means for supporting the spring for limited flexion whereby the stop is engageable with the abutment portion of the spring to stall the torque motor when the brake is fully released.

2. Stopping mechanism for the releasing motor of a spring applied brake comprising a stop lug connected to and moved by the motor when the latter is operated, and a torsion spring having an abutment portion engageable with the lug to prevent movement of the brake beyond full release position.

3. Stopping mechanism for a releasing motor geared to a spring applied brake and comprising a stop lug connected to and moved by the gearing, a stationary flange partially surrounding the path of movement of the lug and a torsion coil spring loosely encircling the flange and having its ends extended inwardly into the path of movement of the lug to prevent movement of the brake beyond full released position upon operation of the motor in either direction.

4. A braking system comprising a main motor, braking means for the main motor biased to braking position, operating mechanism for releasing the braking means, a brake motor, motion transmission mechanism between the brake motor and said operating mechanism including a gear wheel, a housing for the gear wheel, a cover for the housing having an arcuate flange adjacent the gear wheel, stop lugs adjustably secured to the gear wheel and projecting into the arcuate flange and a torsion spring encircling the arcuate flange and having inturned ends engageable with the stop lugs to limit the releasing motion transmitted to the braking mechanism.

5. A brake system comprising a main motor, braking means for the main motor biased to braking position, operating mechanism for controlling the application and release of the braking means and including a brake operating lever, a reversible brake motor, a crank shaft, gearing between the brake motor and the crank shaft, a crank on the crank shaft, a link connecting said crank and said brake operating lever, stop lugs adjustably secured to the gearing, and yieldable abutments cooperable with the stop lugs to limit the releasing motion transmitted to the braking mechanism upon operation of the brake motor in either direction.

6. A brake system comprising a main motor, braking means for the main motor biased to braking position, operating mechanism for controlling the application and release of the braking means and including a brake operating lever, a brake motor, a crank shaft, gearing between the brake motor and the crank shaft, a crank on the crank shaft, a link connecting said crank and said brake operating lever, stop lugs adjustably secured to the gearing, and yieldable abutments cooperate with the stop lugs to limit the releasing motion transmitted to the braking mechanism, and a brake controlled by said link for preventing over-running of the brake motor upon application of the brake.

7. In a device of the character having a brake biased to applied position, a releasing motor for the brake and motion transmission means between the motor and the brake, a stop connected to and moved by the motor and a coil spring having a portion providing an abutment and positioned to be engageable with the stop to bring the motor and braking mechanism to a smooth and gradual stop when the brake is fully released.

8. In a device of the character having a brake biased to applied position, a releasing motor for the brake and motion transmission means between the motor and the brake, a stop connected to and moved by the motor and a coil spring having a portion providing an abutment and positioned to be engageable with the stop to bring the motor and braking mechanism to a smooth and gradual stop when the brake is fully released and positive stopping means operable to positively stop the motor in event of flexion of the spring in excess of a predetermined amount.

9. In a device of the character having a brake biased to applied position, a releasing motor for the brake and motion transmission means between the motor and the brake, a stop connected to and moved by the motor and a spring having a portion providing an abutment, said spring being supported to provide for limited flexion thereof and having its abutment portion positioned to be engageable with the stop to bring the motor and braking mechanism to a smooth and gradual stop when the brake is fully released.

GEORGE J. LEXA.